United States Patent [19]
Inagami et al.

[11] Patent Number: 5,506,980
[45] Date of Patent: Apr. 9, 1996

[54] METHOD AND APPARATUS FOR PARALLEL PROCESSING OF A LARGE DATA ARRAY UTILIZING A SHARED AUXILIARY MEMORY

[75] Inventors: Yasuhiro Inagami; Yoshiko Tamaki, both of Kodaira; Katsuyoshi Kitai, Hadano; Teruo Tanaka, Hachiouji; Tadayuki Sakakibara, Kunitachi, all of Japan

[73] Assignee: Hitachi, Ltd., Tokyo, Japan

[21] Appl. No.: 964,845

[22] Filed: Oct. 22, 1992

[30] Foreign Application Priority Data

Oct. 22, 1991 [JP] Japan .................................. 3-302266

[51] Int. Cl.⁶ .............................. G06F 12/00; G06F 13/00
[52] U.S. Cl. ........................ 395/486; 395/800; 395/477; 395/481; 364/228.1; 364/228.3; 364/229; 364/238.4; 364/239; 364/240; 364/243; 364/243.1; 364/243.2; 364/243.4; 364/246.8; 364/254; 364/254.3; 364/259.2; 364/260; 364/DIG. 1
[58] Field of Search ..................... 395/800, 500, 395/425, 375, 400, 486, 477, 481; 364/DIG. 1, DIG. 2

[56] References Cited

U.S. PATENT DOCUMENTS

| | | | |
|---|---|---|---|
| 3,631,405 | 12/1971 | Hoff et al. ........................... | 364/200 |
| 4,164,787 | 8/1979 | Aranguren ........................... | 395/425 |
| 4,561,051 | 12/1985 | Rodman et al. ...................... | 395/425 |
| 4,733,352 | 3/1988 | Nakamura et al. ................... | 364/200 |
| 5,175,837 | 12/1992 | Arnol et al. ......................... | 395/425 |
| 5,222,224 | 6/1993 | Flynn et al. ......................... | 395/425 |
| 5,283,886 | 2/1994 | Nishii et al. ........................ | 395/425 |
| 5,291,442 | 3/1994 | Emma et al. ........................ | 395/425 |

*Primary Examiner*—Meng-Ai An
*Attorney, Agent, or Firm*—Antonelli, Terry, Stout & Kraus

[57] ABSTRACT

In a multiprocessor system having a plurality of main memories and a shared extended memory, each main memory is associated with an extended memory partial write control. When an extended memory partial write instruction is issued, tag information identifying updated portions of main memory data is transferred to the associated extended memory partial write control along with the main memory data. Each time a subblock of the main memory data arrives, the extended memory partial write control performs a partial write operation to substitute those portions of the main memory data which are identified by the tag information for the corresponding portions of a data subblock in a specified extended memory area. During this partial write operation, that specified extended memory area is kept locked.

9 Claims, 7 Drawing Sheets

METHOD AND APPARATUS FOR PARALLEL PROCESSING OF A LARGE DATA ARRAY UTILIZING A SHARED AUXILIARY MEMORY

BACKGROUND OF THE INVENTION

The present invention relates to a data processing method and system. More particularly, it concerns a parallel processing method and system suitable for processing a very large data array in parallel with use of a plurality of processors.

Some supercomputers and very large-scale computers have not only a first memory called a main memory or main storage, but also a second random access memory. The second random access memory is called an extended storage, system memory, or paging storage in connection with its primary use, and will hereinafter be referred to as an extended memory. The extended memory has a far larger capacity than the main memory although it cannot operate at such a high speed as the main memory. It is primarily provided for high-speed input/output processing. More particularly, it is intended to speed up input/output processing by a factor of hundreds to thousands by placing input/output files on the extended memory rather than on a magnetic disk. For instance, U.S. Pat. No. 4,476,524 entitled "Page Storage Control Method and Means" by David T. Brown et al., issued on Oct. 9, 1984, disclosed a page storage as an example of the extended memory. An example of the computer having the extended memory is found in the Supercomputer S-820 of Hitachi Seisakusho Co. The extended memory of the S-820 has a capacity up to 12 gigabytes and a data transfer rate of 2 gigabytes per second, while its main memory has a capacity up to 512 megabytes and a data transfer rate of 16 gigabytes per second.

The extended memory forms an address space different from that of the main memory. Data on the extended memory cannot be transferred directly to a processing unit, nor can the processing unit write data directly into the extended memory. However, there are provided instructions for directing data transfer between the extended memory and the main memory. The processing unit can use these instructions to transfer the required data from the extended memory to the main memory before processing it, and also to transfer the processed results, after storing them into the main memory, to the extended memory therefrom.

The extended memory is featured in that it provides a memory having a very large capacity and a relatively high data transfer rate at a lower cost than the main memory. For this purpose, it is combined with an access control mechanism different from that of the main memory. More particularly, the extended memory has an addressable data unit size restricted to a large block, for example, 4 kbytes, while the main memory is structured so that individual bytes can be accessed at a high rate. In compensation for that, the extended memory has a mechanism for transferring such a large block of data at a high rate. In order to efficiently transfer the large block of data, it is common to subdivide this large block into small blocks of a few to tens of bytes and to successively transfer these small blocks. In the Supercomputer S-820 of Hitachi Seisakusho Co. mentioned above, too, the addressable data unit size of its extended memory is 4 kbytes, and the instructions for data transfer between the main memory and the extended memory can specify an integer multiple of the 4 kbytes as the amount of data to be transferred. Such a large amount of data is subdivided into small blocks of 32 to 64 bytes, and these small blocks are successively transferred. This accomplishes a data transfer rate of as high as 2 gigabytes per second.

The supercomputers and very large-scale computers are expected chiefly to execute large-scale calculations at a high speed. Therefore, they have to have both a superhigh-speed computation mechanism and a large capacity memory. In order to accomplish superhigh-speed computation, it is known that a parallel processing system is useful in which a plurality of processors can process a single program in parallel. For the large capacity memory, it is not advisable to provide a main memory of a very large capacity since its price is high.

Accordingly, it is desired that the extended memory could be used as a large capacity storage area for computation as well as for high-speed input/output processesing as in prior art. More particularly, it may be contemplated that the extended memory should be used as means to implement a large capacity storage area exceeding the main memory capacity, and further as means to implement a storage area for computation available for cooperation of a plurality of processors in a multiprocessor configuration in order to accomplish superhigh-speed computation by parallel processing. Such a storage area, if actualized, would allow the supercomputers and very large-scale computers to execute more large-scale computation at a higher rate.

However, it is hard to say that the extended memory of prior art has functions enough to implement such a large capacity storage area exceeding the main memory capacity and available for cooperation of processors in a multiprocessor configuration as discussed above so as to speed up large-scale computation. The reason is as follows.

Assume two processors having different main memories cooperate to calculate a single large-scale data array. If a first processor calculates odd-numbered elements of the data array and a second processor calculates even-numbered elements, the two processors can concurrently operate so that they can calculate all the elements in about a half of the time taken for a single processor to calculate the entire array. After this, however, it is needed to merge the odd- and even-numbered elements to complete a single data array. For this purpose, one processor has to transfer all the elements it calculated from its main memory to the extended memory. The other processor, in turn, has to transfer these elements from the extended memory to its main memory to merge them with the elements it calculated to form a single data array, and has then to transfer this single data array to the extended memory. It is impossible to merge the odd-numbered elements with the even-numbered elements on the extended memory with correct relative positioning to form the single data array. Assume the addressable data unit size in the extended memory be 4 kbytes. If the extended memory has 4-kbyte data including the odd-numbered elements from the main memory of the first processor and 4-kbyte data including the even-numbered elements from the main memory of the second processor transferred into the same area thereof, the result will be that the entire 4-kbyte data transferred earlier is simply replaced by the entire 4-kbyte data transferred later.

SUMMARY OF THE INVENTION

In view of the foregoing, it is an object of the present invention to provide a parallel processing method in which an extended memory is used as a shared memory area for computation.

Another object of the present invention is to provide a parallel processing system suitable to a parallel processing method in which an extended memory is used as a shared memory area for computation.

Still another object of the present invention is to provide a partial write mechanism useful for parallel processing in which extended memory is used as a shared memory area for computation.

In the parallel processing method according to the present invention, a first processing unit calculates a first partial array of a data array and write it into a first main memory. A second processing unit calculates a second partial array of the data array in parallel with the first processing unit and writes it into a second main memory. Both of the processing units transfer their respective calculated partial arrays from their respective main memories to an extended memory to form within the extended memory a single data array containing their partial arrays.

Writing each of the partial arrays into the extended memory can be performed by means of partial write operations. Each of the processing unit produces tag information that specifies the parts of data to be written into the extended memory by the partial write operations, and transfers the tag information to the extended memory along with the partial array it calculated.

In the parallel processing system according to the present invention, each of a first extended memory control for the first processing unit and a second extended memory control for the second processing unit contain a partial write circuit. Each partial write circuit substitutes specified parts of data transferred from the main memory connected therewith for the corresponding parts of data in the extended memory.

Each of the processing units may have a tag memory for holding the tag information. The first and second extended memory controls may have an extended memory exclusive access control circuit connected thereto in common. The extended memory exclusive access control circuit locks an area in the extended memory while a partial write operation requested by one of the processing units is taking place at this area, thereby preventing a write operation into the same area requested by the other processing unit from being executed.

The partial write circuit according to the present invention contains, among others, a tag information receiving circuit and a merge circuit controlled by the received tag information. The merge circuit substitutes the parts of the received data identified by the tag information for the corresponding parts of data read out of a specified area in a memory to generate merged data to be written back into the same area.

BRIEF DESCRIPTION OF THE DRAWINGS

The present invention will be fully described making reference to the accompanying drawings in which.

DETAILED DESCRIPTION OF THE PREFERRED EMBODIMENTS

Figure 1:
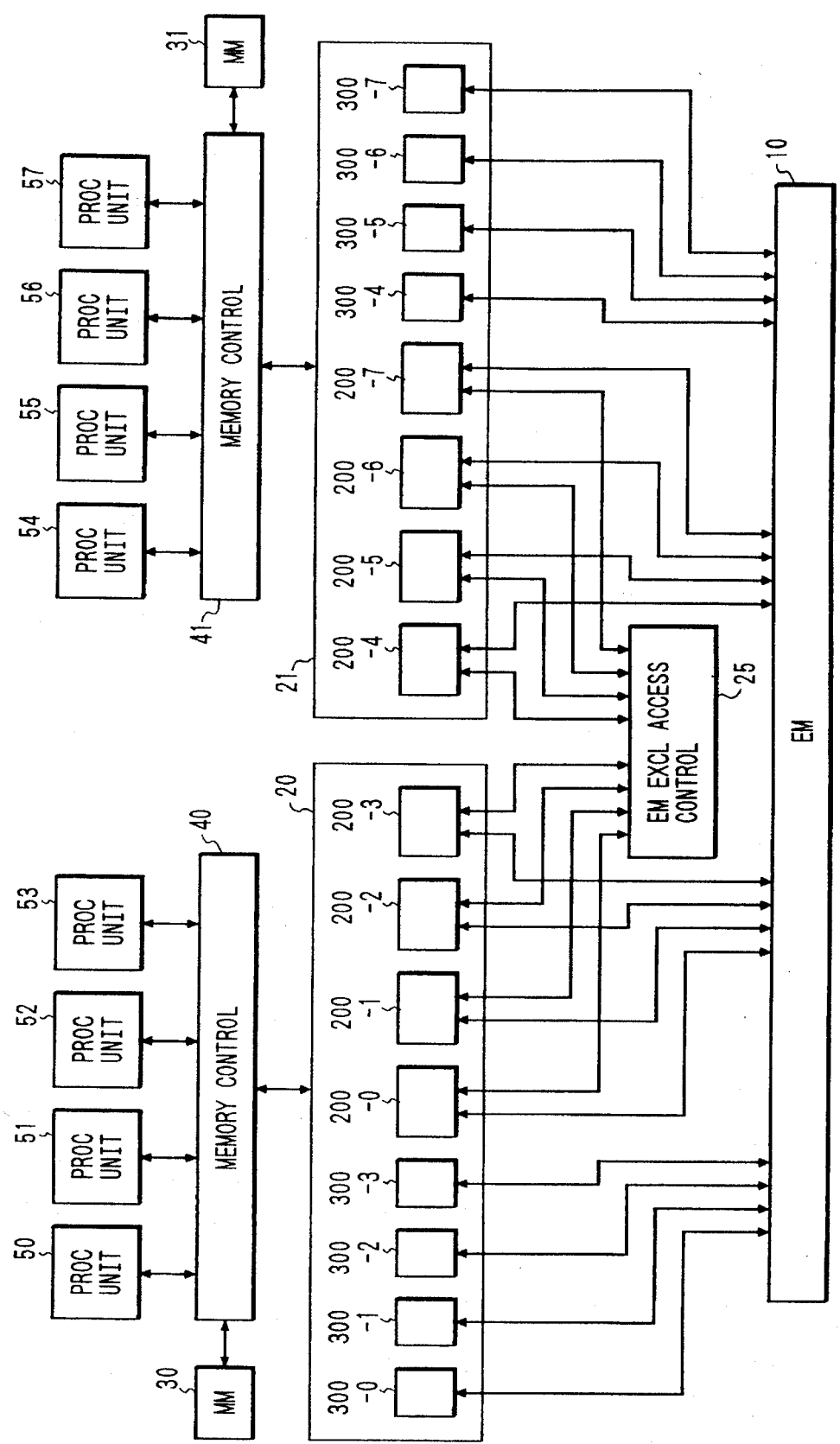
FIG. 1 is a block diagram showing an embodiment of the parallel processing system of the present invention.

FIG. 1 shows an embodiment of the parallel processing system in accordance with the present invention. As shown in the figure, a first group of processing units 50 to 53 are connected to a first main memory 30 through a first memory control 40. A second group of processing units 54 to 57 are connected to a second main memory 31 through a second memory control 41. The first memory control 40 is connected to an extended memory 10 through a first extended memory access control 20. The second memory control 41 is connected to the extended memory 10 through a second extended memory access control 21. Both the first and second extended memory access controls 20 and 21 are also connected to an extended memory exclusive access control 25. The first extended memory access control 20 comprises extended memory read controls 300-0 to 300-3 and extended memory write controls 200-0 to 200-3 which are associated with the first group of processing units 50 to 53, respectively. The second extended memory access control 21 comprises extended memory read controls 300-4 to 300-7 and extended memory write controls 200-4 to 200-7 which are associated with the second group of processing units 50 to 53, respectively. Note that the number of the processing units to be connected to each memory control is not substantial to the present invention. Also note that a single extended memory may be connected to three or more subsystems each of which comprises one or more processing units, a main memory, a memory control, and an extended memory access control.

The extended memory write controls 200-0 to 200-7 are modified as compared with prior art for implementing a partial write feature of the present invention which will be described later. The extended memory exclusive access control 25 is newly introduced in accordance with the present invention for locking and unlocking any of areas in the extended memory 10, which is needed in connection with the partial write feature. These elements will be explained in detail later. The all other elements are substantially the same as in prior art, and accordingly the detailed description of them is omitted.

Figures 2, 3:
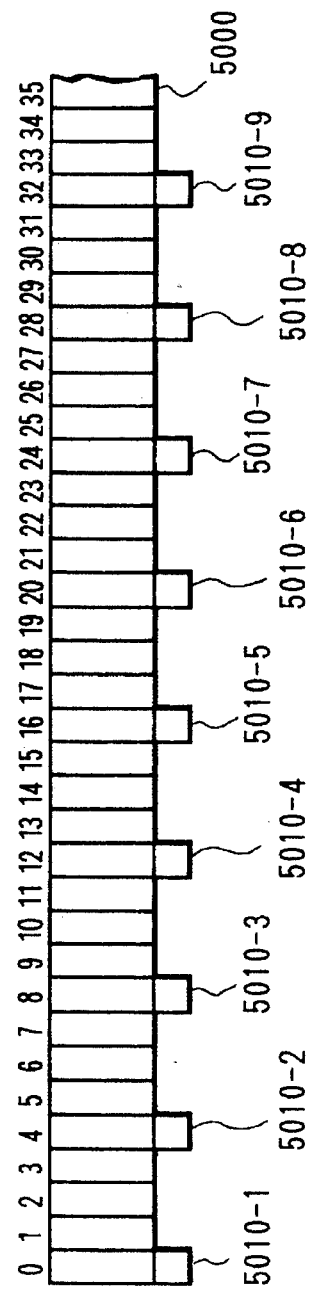
FIG. 2 illustrates formats for instructions for use for data transfer between an extended memory and a main memory.
FIG. 3 is a schematic representation illustrating relationship between byte areas in the main memory and tag information corresponding thereto.

FIG. 2 illustrates formats for instructions for use for data transfer between the extended memory 10 and either of the main memories 30 and 31. FIG. 2(a) is the format for a conventional EXTENDED MEMORY READ instruction for use for data transfer from the extended memory to the main memory. The first field of this format is an operation code representing an operation of reading data from the extended memory. The second field is the starting address of an area in the main memory into which the transferred data is to be stored. The third field is the starting address of an area in the extended memory from which the data is to be read. The main memory address is specified with a byte boundary, while the extended memory address is specified with a 4-kbyte boundary. The final field indicates the amount of data to be transferred. This amount of data is restricted to an integer multiple of 4-kbytes, and the final field indicates this very integer. If data of 20 kbytes are to be transferred, for example, this field indicates a value of "5".

FIG. 2(b) is the format for a conventional EXTENDED MEMORY WRITE instruction for use for data transfer from the main memory to the extended memory. The first field of this format is an operation code representing an operation of writing data into the extended memory. The second field is the starting address of an area in the extended memory into which the transferred data is to be stored. The third field is the starting address of an area in the main memory from which the data is to be read. The final field indicates the amount of data to be transferred.

FIGS. 2(c) and 2(d) show formats for instructions for partial write operation according to the present invention. These formats will be explained later.

An explanation will now be given, showing a specific example, as to how to place on the extended memory data arrays too large to be placed in their entirety on the main memory, and how to process these arrays by the processing units in parallel, in the above-described parallel processing system.

Assume the following FORTRAN program be required to execute.

```
        REAL  *4  A (1000000)
        REAL  *4  B (1000000)
        REAL  *4  C (1000000)
        DO 10  I = 1, 1000000
 10         A(I) = B(I) + C(I)
```

Also, assume these arrays A, B, and C be too large to be entirely stored in either of the main memories 30 or 31. Since each of the arrays consists of 1,000,000 (1 million) elements, and each element is 4 bytes long, the size of each array is 4,000,000 bytes. The addressable data unit size of the extended memory 10 is 4 kbytes, precisely 4,096 bytes, and each array is located in an area beginning at a 4-kbyte boundary. Each area of 4 kbytes (4,096 bytes) beginning at a 4-kbyte boundary in the extended memory 10 will be referred to as the page hereinafter. 977 pages are needed for storing each of the arrays A, B, and C, since 4,000,000/4,096=976.5.

Each array is located on successive 977 pages beginning at a certain 4-kbyte boundary. The area of 1,792 bytes on the last page is left unused.

The parallel processing system shown in FIG. 1 can have eight processing units at maximum perform parallel processing. For the sake of simplicity, however, assume the FORTRAN program shown above be executed in parallel by the processing units 50 and 54 alone. Also, assume that the calculation of the first 500,000 of the total of 1,000,000 elements, or the calculation for the variable I of the DO loop from 1 to 500,000, be performed by the processing unit 50, and concurrently therewith, the calculation of the remaining 500,000 elements, or the calculation for the variable I of the DO loop from 500,001 to 1,000,000, be made by the processing unit 54.

Owing to such distributed processing, each of the processing units 50 and 54 should process only one half of each of the arrays A, B, and C, or 500,000 elements per array. This means that each of the main memory 30 and 31 connected to the processing units 50 and 54, respectively, needs only to store one half of each array. As a result, the relatively small capacity main memories are enough for parallel processing of very large arrays.

If the arrays are so large that the main memory cannot contain even a half of these, each processing unit may process only parts of the arrays of a size that the main memory can contain, transfer the processed results to the extended memory, and repeat processing other parts to the end in the same manner. However, such sequentially divided processing itself has nothing to do with the essence of the present invention. So, let us here, assume each of the main memories 30 and 31 can contain a half of each of the arrays.

Then, the first half of each of the arrays A, B, and C are processed as follows. The first half 500,000 elements of each of these arrays have been stored in the extended memory on the first 489 of the 977 pages allocated to the corresponding array. Note that the last page, or page 489, contains 288 elements from element 499,713 to 500,000 belonging to the first 500,000 elements plus 736 elements from element 500,001 to 500,736 belonging to the last 500,000 elements.

It is needed to reserve an area in the main memory 30 to store the first half of each of the arrays A, B, and C before the processing unit 50 processes the first 500,000 elements. Each half array needs an area of a size of 1,956 kbytes, precisely 2,002,944 bytes, equivalent to 489 pages in the extended memory 10. The areas reserved in the main memory 30 for the first half elements of the arrays A, B, and C are referred to as work areas A0, B0, and C0, respectively.

Processing the first 500,000 elements are made as follows.

(1) The first 489 pages in each of the areas for the arrays B and C in the extended memory 10 is transferred to the respective work areas B0 and C0 reserved in the main memory 30. For this transfer is used the EXTENDED MEMORY READ instruction shown in FIG. 2(a). The EXTENDED MEMORY READ instruction for the transfer of the array B designates the starting address of the work area B0 as the main memory address, the address of the first page of the array B area as the extended memory address, and "489" (pages) as the amount of transferred data. The EXTENDED MEMORY READ instruction for the array C contains similar designations.

(2) The element data are successively read out of the work areas B0 and C0 in the main memory 30, and are fed to the processing unit 50 which adds the corresponding elements. The element data obtained as the sums are successively written into the work area A0 in the main memory 30. The amount of the written data is 500,000 elements, that is, 2,000,000 bytes. The work area A0 has a capacity of 2,002,944 bytes as described above. Its last part for 2,944 bytes, or 736 elements, has nothing written thereinto.

The last 500,000 elements have to be similarly processed, but the situation is somewhat different. More particularly, the first element of the last 500,000 elements, that is, element 500,001, is not located on a 4-kbyte boundary in the extended memory 10. Element 500,001 is the 289th element in page 489 in each array area. In the extended memory read operation, only a 4-kbyte boundary can be designated as an extended memory address, and accordingly the area beginning at the top of the page containing the element 500,001 must be transferred to the main memory 31.

The areas reserved in the main memory 31 for the last half elements of the arrays A, B, and C are referred to as work areas A1, B2, and C3, respectively. Each of these work areas, like the work areas A0, B0, and C0, has a size of 489 pages (1,956 kbytes, precisely 2,002,944 bytes).

The last 500,000 elements are processed as follows.

(1) The last 489 pages, including page 489 transferred to the main memory 30 for the processing of the first half, in each of areas for the arrays B and C in the extended memory 10 is transferred to the respective work areas B1 and C1 reserved in the main memory 31. For this transfer is used the EXTENDED MEMORY READ instruction shown in FIG. 2(*a*). The EXTENDED MEMORY READ instruction for the transfer of the array B designates the starting address of the work area B1 as the main memory address, the address of page 489 of the array B area as the extended memory address, and "489" (pages) as the amount of transferred data. The EXTENDED MEMORY READ instruction for the array C contains similar designations. By this transfer operation, excessive 288 elements from element 499,713 to 500,000 which do not belong to the last half also are transferred.

(2) The element data are successively read out of the work areas B1 and C1 in the main memory 31, and are fed to the processing unit 51 which adds the corresponding elements. The element data obtained as the sums are successively written in the work area A1 in the main memory 31. The amount of the written data is 500,000 elements, that is, 2,000,000 bytes. The work area A1 has a capacity of 2,002,944 bytes as described above. Its parts for 2,944 bytes, or 736 elements, that is, the first part for 1,152 bytes, or 288 elements, and the last part for 1,792 bytes, or 448 elements, have nothing written thereinto.

In the present example, the addressing of the work area A1 is made so that the starting element in the work area A1 corresponds to the starting element on page 489 of the array A area in the extended memory 10. The starting portion of the work area A1, however, is a place where element 497,713 is stored rather than element 500,001. The place where element 500,001 is stored is a 4 byte section beginning at the 1153th byte from the start of the work area A1, skipping the first bytes equivalent to 288 elements.

The processing of the last 500,000 elements by the main memory 31 and the processing unit 54 is performed in parallel with the processing of the first 500,000 elements by the main memory 30 and the processing unit 50.

Subsequently, it is needed to write into the array A area in the extended memory 10 the calculated first 500,000 elements stored in the work area A0 in the main memory 30 and the calculated last 500,000 elements stored in the work area A1 in the main memory 31.

It should be noted here that each of the area for the last one page in the work area A0 and the area for the first one page in the work area A1 holds 1,024 elements from element 499,713 to 500,736 of the array A. Of these elements, 288 elements from element 499,713 to 500,000 have been calculated by the processing unit 50 and stored in the main memory 30. On the other hand, 736 elements from element 500,001 to 500,736 have been calculated by the processing unit 54 and stored in the main memory 31.

Pages other than the one mentioned above, that is, pages from the first page to page 488 in the work area A0 and pages from page 2 to the last page (page 489) in the work area A1, do not include array elements to be calculated by the other processing unit. This means that those pages can be transferred from the main memories 30 and 31 to the extended memory 10 independently and concurrently. For this transfer is used the EXTENDED MEMORY WRITE instruction shown in FIG. 2(*b*).

The EXTENDED MEMORY WRITE instruction for the transfer of the pages from the first page to page 488 in the work area A0 designates the address of the starting page of the array A area in the extended memory 10 as the extended memory address, the starting address of the work area A0 as the main memory address, and "488" (pages) as the amount of transferred data.

On the other hand, the EXTENDED MEMORY WRITE instruction for the transfer of the pages from the second page to the last page in the work area A1 designates the address the page 490 of the array A area in the extended memory 10 as the extended memory address, the sum of the starting address of the work area A1 and "4,096" (bytes) or the size of one page as the main memory address, and "488" (pages) as the amount of transferred data.

Now, an detailed explanation will be given as to how data of the page doubly held in both the work area A0 and the work area A1 can be stored into the corresponding part of the array A area in the extended memory 10 in accordance with the present invention. That part of the array A area is an area for holding the elements from element 499,713 to 500,736 of the array A. Of these elements, the first 288 elements have been calculated by the processing unit 50 and stored in the main memory 30, and the last 736 elements are calculated by the processing unit 54 and stored in the main memory 31. Such a page held doubly or more in different main memories as described above will hereinafter be referred to as a mixed page.

In order to handle the mixed page, the present invention introduces the following means.

(1) Tag information

Tag information is provided to identify the calculated data in the mixed pages stored in the main memory and specifies data portions to be written into the extended memory in the partial write operation which will be fully described later. It is convenient that the tag information should be provided so that it can identify every data unit which the system can process. In the present embodiment has the tag information is provided for every four bytes since it is capable of performing single precision computation dealing with 4-byte data and double precision computation dealing with 8-byte data.

FIG. 3 is a schematic representation illustrating relationship between byte areas in the main memory and the tag information corresponding to them in the present embodiment. The main memory area 5000 is subdivided into sections of 1-byte size as usual. These sections have addresses serially assigned thereto beginning at 0. The tags 5010-1 to 5010-9 are provided for every 4-byte boundary in the data area. Each of the tags assumes a value of either ON or OFF, thus being represented by only one bit.

(2) EXTENDED MEMORY PARTIAL WRITE instruction

An EXTENDED MEMORY PARTIAL WRITE instruction is used to transfer mixed pages to the extended memory. It causes a partial write operation into the extended memory to take place. More particularly, when this instruction is executed, data from the main memory are sent along with the corresponding tag information to the extended memory access control. The extended memory access control extracts the data portions identified by the tag information from among the data from the main memory. It then writes only those identified data portion into the extended memory. FIGS. 2(*c*) and 2(*d*) show two examples of the format for the EXTENDED MEMORY PARTIAL WRITE instruction. The details of these formats will be explained later.

The tag information can be handled by either hardware or software. Tag generation by software will be described later. For processing the tag information by hardware are provided the following two means.

(1) CLEAR TAG instruction

A CLEAR TAG instruction specifies a main memory address and data amount as its operands, and clears the tag information corresponding to the area of the specified data amount beginning at the specified address, or forces all the values into OFF. The name of the CLEAR TAG instruction is abbreviated to "CLRTAG".

(2) Automatic tag information setting mechanism

When the processing unit writes data into the main memory, an automatic tag information setting mechanism turns the tag information corresponding to a location into which the data is written to ON.

Figure 4:
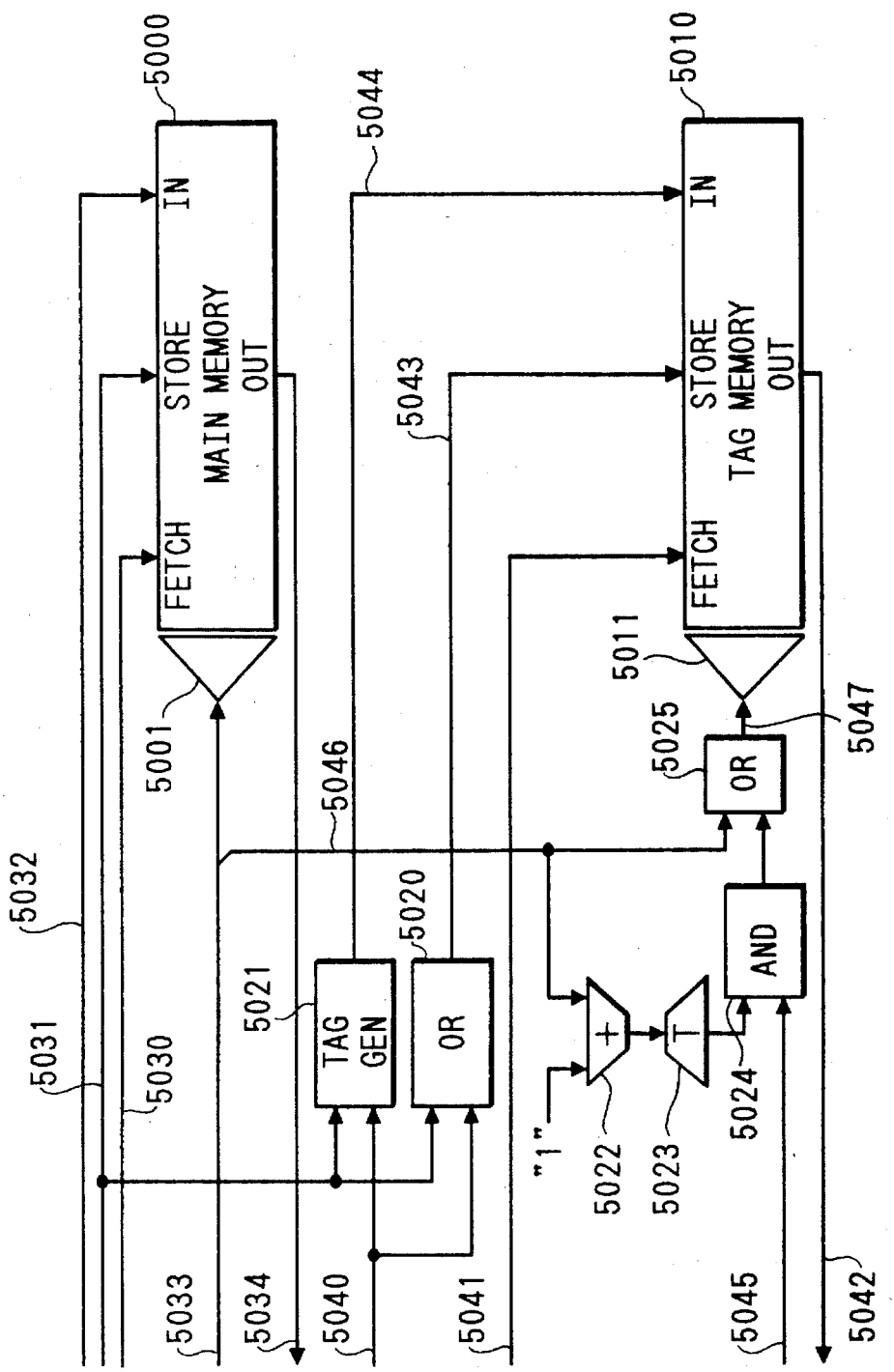
FIG. 4 is a block diagram showing an example of a tag information handling circuit.

FIG. 4 shows an example of a tag information handling circuit. An address decoder 5001 decodes address data sent through a signal line 5033 to identify a location to be accessed in the main memory area 5000. A signal line 5030 carries a main memory fetch control signal, a signal line 5031 carries a main memory store control signal, and signal line 5032 carries the data to be stored into the main memory area 5000. Data fetched from the main memory area 5000 is sent out through the signal line 5034. Those components and their functions are similar to those of a prior art main memory. The signal lines 5030 to 5033 mentioned above and signal lines 5040 to 5042 and 5045 which will be described later are all connected to the memory control 40 or 41.

There are provided a tag memory 5010 and its peripheral circuits according to the present invention. An address decoder 5011 is an address decoder for the tag memory 5010. It decodes address data fed through a signal line 5047 to identify a location to be accessed in the tag memory 5010. A signal on the signal line 5040 goes to ON when the CLRTAG instruction for clearing the tag information is executed. A signal on the signal line 5041 becomes ON when the EXTENDED MEMORY PARTIAL WRITE instruction is executed, thereby directing fetching tag information used for partial writing into the extended memory. The fetched tag information is sent out through the signal line 5042.

The address of the tag memory area to be accessed is derived from the main memory address fed through the signal line 5030. As described above with reference to FIG. 3, a tag is provided for every 4-byte boundary in the main memory area 5000. Accordingly, a part except 10 the two least significant bits of the main memory address on the signal line 5030 is branched to a signal line 5046, and is fed to the decoder 5011 through an OR circuit 5025 and a signal line 5047. The address data on the signal line 5046 is also incremented by "1" by an adder 5022, is delayed a predetermined period of time by a timer 5023, and then is sent to a first input of an AND circuit 5024. A second input of the AND circuit 5024 is a double precision computation signal fed through the signal line 5045. An output of the AND circuit 5024 also is fed to the decoder 5011 through the OR circuit 5025 and the signal line 5047. As a result, while the double precision computation is being performed, a tag at a location corresponding to the 4 bytes beginning at the specified main memory address and a tag corresponding to the succeeding four bytes in the main memory are successively accessed, whereby it is feasible to access tag information covering 8-byte data for the double precision computation.

A signal on the signal line 5043 directs a tag memory store operation. The signal on the signal line 5043 is generated from an OR circuit 5020 by an OR combination of the main memory store control signal on the signal line 5031 and the CLRTAG signal on the 10 signal line 5040. Thus, a tag memory store operation takes place when data is stored into the main memory or when a CLRTAG instruction for clearing the tag information is executed.

A signal line 5044 feeds a value (ON or OFF) to be stored into the tag memory. The value on the signal line 5044 to be stored is generated by a tag generating circuit 5021. The tag generating circuit 5021 generates an ON signal while the main memory store control signal on the signal line 5031 is indicating a data store operation, or generates an OFF signal while the CLRTAG signal on the signal line 5040 is ON.

The tag information handling circuit described above operates as follows to implement the functions needed for the present invention.

(1) When a CLRTAG instruction is executed, a tag clearing direction is given to the OR circuit 5020 through the signal line 5040. Responding to this direction, the OR circuit 5020 generates the tag memory store control signal. The address of the tag memory area to be cleared is fed to the tag memory 5010 through the signal lines 5033 and 5046 and the OR circuit 5025. At the same time, the tag generating circuit 5021 generates a value OFF on the signal line 5044, thereby clearing the tag memory area corresponding to the specified main memory area. The memory control supplies successive main memory addresses covering the entire area corresponding to the data amount specified by the CLRTAG instruction.

(2) If a main memory store operation is indicated through the signal line 5031, data is stored in the main memory address specified by a signal on the signal line 5033, and at the same time, the OR circuit 5020 responds to the main memory store control signal on the signal line 5031 to generate a tag memory store control signal on the signal line 5043. During this, the tag generating circuit 5021 responds to the same main memory store control signal to generate a value ON on the signal line 5044 as the data to be stored. A location at which the data are stored is fed through the signal lines 5033 and 5046 and the OR circuit 5025. If the double precision computation is specified, the next tag address is automatically generated in a predetermined time by the adder 5022, the timer 5023, and the AND circuit 5024. Another ON data is stored into that next tag address. In this way, at the same time as data is stored at a certain location in the main memory 5000, the tag information in the corresponding location in the tag memory 5010 also is automatically set to ON.

(3) If an EXTENDED MEMORY PARTIAL WRITE instruction is executed, an indication thereof is given to the tag memory 5010 through the signal line 5041. This indication serves as a fetch control signal for the tag memory 5010. The address of the tag information to be fetched is fed to the tag memory 5010 through the signal lines 5033 and 5046 and the OR circuit 5025. The fetched tag information is sent out through the signal line 5042. Thus, at the same time as data is fetched from a certain location in the main memory 5000, the tag information at the corresponding location in the tag memory 5010 is automatically fetched.

FIG. 2(c) shows an the example of the format for the EXTENDED MEMORY PARTIAL WRITE instruction suitable where the hardware described above is provided. This format is the same as the EXTENDED MEMORY PARTIAL WRITE instruction given in FIG. 2(b) except that the operation code is a code representing an extended memory partial write operation. The EXTENDED MEMORY PARTIAL WRITE instruction, however, implicitly directs that in addition to the data in the specified main memory area, the tag information corresponding to that main memory area should be sent to the extended memory access control.

In turn, the following describes a process in which 10 mixed pages placed in the main memories 30 and 31 are stored into the corresponding page in the extended memory 10 with use of the automatic tag information setting mechanism and the EXTENDED MEMORY PARTIAL WRITE instruction explained above.

In the first processing stage, the processing units 50 and 54 clear all the tags corresponding to those areas in the main memories 30 and 31 which are expected to contain mixed pages with use of the CLRTAG instruction mentioned above.

Then, the processing units 50 and 54 compute the first and last halves, respectively, of the calculation specified by the FORTRAN program shown above. The elements from element 499,713 to 500,000 of the array A obtained by the processing unit 50 are stored into the corresponding locations on the mixed page in the main memory 30. At the same time as the above storing, the tags corresponding to those locations is automatically set to ON by the automatic tag information setting mechanism mentioned above. In a similar manner, the elements from element 500,001 to 500,736 obtained by the processing unit 54 are stored into the corresponding locations on the mixed page in the main memory 31, and at the same time, the corresponding tags are automatically set to ON.

When the both processing units have completed the calculations, the tags corresponding to the mixed page in the main memory 30 are ON at the locations corresponding to the first 288 elements from element 499,713 to 500,000, but are OFF at the locations corresponding to the last 736 elements from element 500,001 to 500,736. On the other hand, the tags corresponding to the mixed page in the main memory 31 are OFF at the locations corresponding to the first 288 elements from element 499,713 to 500,000, but are ON at the locations corresponding to the last 736 elements from element 500,001 to 500,736. In this state, each of the processing units 50 and 54 executes an EXTENDED MEMORY PARTIAL WRITE instruction shown in FIG. 2(*c*).

The EXTENDED MEMORY PARTIAL WRITE instruction executed by the processing unit 50 designates the address of page 489 of the array A as the extended memory address, the starting address of the mixed page as the main memory address, and "1" (page) which means 4 kbytes as the amount of transferred data. As a result of the execution of this EXTENDED MEMORY PARTIAL WRITE instruction by the processing unit 50, only those elements on the mixed page sent from the main memory 30 whose corresponding tags are ON, that is, the 288 elements from element 499,713 to 500,000, are written into the corresponding locations on page 489 of the array A in the extended memory 10. The remaining 736 elements the corresponding tags of which are OFF are not written into the extended memory 10, but are abandoned.

The processing unit 54 also executes the same EXTENDED MEMORY WRITE instruction as above. The result, however, is that only the last 736 elements on the mixed page from the main memory 31, that is, the elements from element 500,001 to 500,736, are written into the corresponding locations on page 489 in the array A area in the extended memory 10, but none of the first 288 elements are written.

In the way described above, the two different parts of the array A that have been calculated independently and concurrently by the processing unit 50 connected with the main memory 30 and the processing unit 54 connected with the main memory 31, are written into the corresponding areas in the extended memory 10 with correct relative positioning kept irrespective of the existence of the mixed page. Thus, the computation of a very large array can be executed at a high speed by a plurality of processing units operating in parallel and sharing an extended memory of a large capacity.

As briefly described previously, the tag information may be handled also by software. The following describes how the tag information is handled by software. In the software implementation of tag handling, a programmer should reserve a tag information area in the main memory. The program should be constructed so that the reserved tag information area should have a value ON written at the corresponding locations whenever calculated data belonging to a mixed page is written into the main memory. Such writing of a value ON into the tag information area can be achieved with an ordinary MAIN MEMORY WRITE instruction that specifies an address in the tag information area. Alternatively, a compiler may be constructed so that it automatically generates such a MAIN MEMORY WRITE instruction for that purpose. Clearing the tag information also can be achieved by writing a value OFF with use of an ordinary MAIN MEMORY WRITE instruction. Any of the processing units, however, must be capable of handling individual bits if the tag information is handled by software.

The EXTENDED MEMORY PARTIAL WRITE instruction has to be partially modified. FIG. 2(*d*) shows an example of the format for the modified EXTENDED MEMORY PARTIAL WRITE instruction suitable to the system in which the tag information is handled by software as described above. In the modified EXTENDED MEMORY PARTIAL WRITE instruction, the first to fourth fields are the same as those shown in FIG. (*c*). However, a fifth field is added which indicates the starting address of a tag information area corresponding to the area for the data to be transferred.

In turn, the following describes an example of the extended memory partial write mechanism according to the present invention. In the parallel processing system described above, it may happen that an EXTENDED MEMORY PARTIAL WRITE instruction issued by one of the processing units 50 to 54 and EXTENDED MEMORY WRITE instructions or EXTENDED MEMORY PARTIAL WRITE instructions issued by other processing units are going to access the same page in the extended memory 10 almost at the same time. However, after data has been read out of an area in the extended memory 10 for the purpose of partial writing, other data must not be written into that same area until the completion of rewriting. The reason is that, if such other data are so written, this other data will be destroyed by a rewriting operation for the partial writing performed afterwards.

The simplest way to solve such access conflicts is to keep succeeding EXTENDED MEMORY PARTIAL WRITE instructions or EXTENDED MEMORY WRITE instructions waiting until a preceeding EXTENDED MEMORY PARTIAL WRITE instruction is completely executed. However, this method does not accomplish the highest efficiency for the extended memory into which a large amount of data is incrementally written by a single instruction. The present invention provides a more sophisticated mechanism to resolve the access conflict.

The amount of data transferred between the main memory 30 or 31 and the extended memory 10 in the system shown in FIG. 1, as described above, is an integer times 4 kbytes. In practice, data is transferred 64 bytes by 64 bytes through a signal line of 64 bytes in width. The larger the amount of data transferred at a time is, the shorter the time needed for transfer the entire data is. On the other hand, the larger the amount of data transferred at a time, the wider the signal line extended between the main memory and the extended memory, resulting in increasing wiring cost. The amount of data transferred at a time has to be determined to an optimum value for individual machines. It is preferable to solve the access conflict for each transfer of fractional data, 64 bytes in the present embodiment, not for an instruction in its entirety, so that EXTENDED MEMORY WRITE instructions and/or the EXTENDED MEMORY PARTIAL WRITE instructions issued by different processing units can be overlapped as much as possible in execution.

Figure 5:
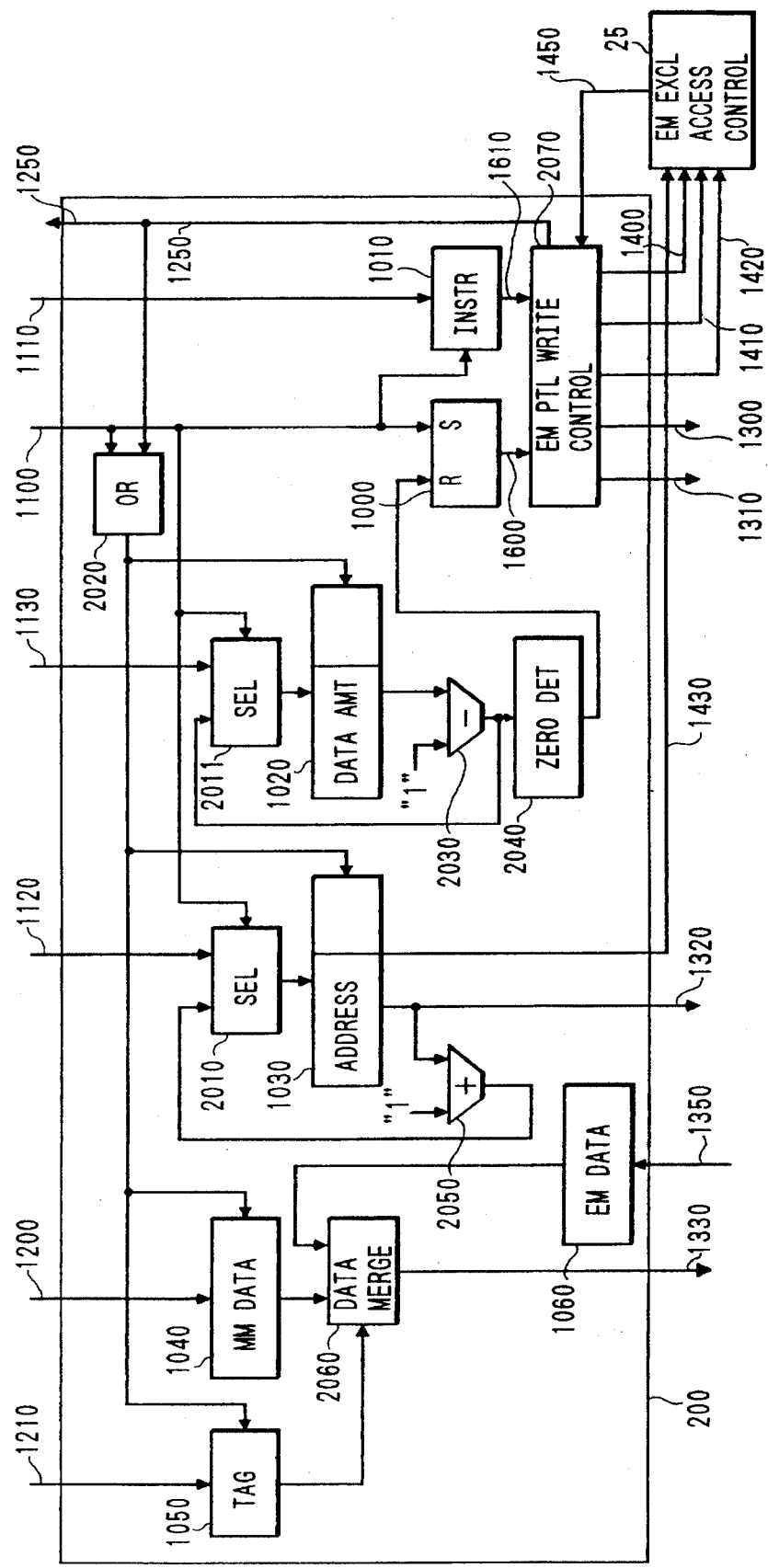
FIG. 5 is a block diagram of either of the extended memory write controls in the system shown in FIG. 1.

FIG. 5 is a detailed diagram showing one of the extended memory write controls 200-0 to 200-7 in the system shown in FIG. 1. In the figure is identified any of the extended memory write controls by a reference numeral 200. While the extended memory exclusive access control 25 is actually connected with the eight extended memory write controls 200-0 to 200-7, FIG. 5 indicates the connection between only one extended memory write control 200 and the extended memory exclusive access control 25. The other seven extended memory write controls are similarly connected with the extended memory exclusive access control 25.

Signal lines 1100, 1110, 1120, and 1130 bring signals from the associated processing unit. If an EXTENDED MEMORY WRITE instruction or an EXTENDED MEMORY PARTIAL WRITE instruction is issued by the associated processing unit, the signal lines 1100, 1110, 1120, and 1130 bring a processing start signal, an instruction code, an extended memory address (a 4-kbyte boundary), and the amount of transferred data which is an integer to be multiplied by 4 kbytes, respectively. Signal lines 1200 and 1210 bring data transferred from the main memory and tag information corresponding thereto, respectively, in synchronism with the issueance of the instruction. As the data from the main memory is transferred 64 bytes in each machine cycle in the present embodiment, the signal line 1200 is 64 bytes wide. The tag information is brought only when an EXTENDED MEMORY PARTIAL WRITE instruction is issued. The tag information corresponding to the 64-byte data is composed of 16 bits, one for every four bytes. When 64-byte data received through the signal line 1200 has been written into the extended memory 10 and this extended memory access control 200 has been prepared to start processing the next 64-byte data, a data request signal that requests the main memory to send the next 64-byte data is sent out through the signal line 1250.

The extended memory access control 200 comprises registers 1000, 1010, 1020, 1030, 1040, and 1050, selector circuits 2010 and 2011, an OR circuit 2020, a subtracter 2030, a zero detector circuit 2040, an adder 2050, a data merge circuit 2060, and an extended memory partial write control 2070.

The register 1000 is a register of the set/reset type which indicates whether or not the extended memory access control 200 is processing an instruction. This register is set by the processing start signal on the signal line 1100 and is reset when the zero detector circuit 2040 detects that the amount of the remaining transferred data is zero. The register 1010 is a register for holding the instruction code for distinguishing the EXTENDED MEMORY WRITE instruction from the EXTENDED MEMORY PARTIAL WRITE instruction. The register 1020 is a register for holding the amount of remaining transferred data. The register 1030 is a register for holding an extended memory address where data is to be stored into or fetched from. The register 1040 is a register of 64 bytes in width for holding data sent from the main memory. The register 1050 is a register of 16 bytes in width for holding tag information corresponding to the data held in the register 1040.

The OR circuit 2020 receives the processing start signal on the signal line 1100 and the data request signal on the signal line 1250 at its two inputs to control data setting to the registers 1020, 1030, 1040, and 1050. Thus, the registers 1040 and 1050 receive the first 64-byte data and the tag information corresponding thereto, respectively, when the processing start signal appears on the signal line 1100, and thereafter receive the succeeding 64-byte data and the tag information corresponding thereto whenever 64-byte data is written into the extended memory 10.

The selector circuit 2010 selects a signal on the signal line 1120 if the processing start signal comes via the signal line 1100, and selects the output signal of the adder 2050 in the other periods. As a resulst, when a processing start signal comes via the signal line 1100, the register 1030 receives an extended memory address transferred in synchronism with the processing start signal, and thereafter, it receives an extended memory address for the succeeding data to be stored that is updated by the adder 2050 whenever data is stored into the extended memory 10.

The extended memory address brought via the signal line 1120 and set in the register 1030 has six "0" bits concatenated after its least significant bit. It should be noted here that data is written into the extended memory 10 64 bytes at a time, while the extended memory address brought through the signal line 1120 is a 4-kbyte boundary. The concatenation of six "0" bits mentioned above extends a 4-kbyte boundary address to a 64-byte boundary address. In other words, a number to be multiplied by 4 kbytes is converted to a number to be multiplied by 64 bytes. The adder 2050 adds a constant "1" to the current 64-byte boundary address in the register 1030 to generate an extended memory address for the suceeding 64-byte data whenever 64-byte data is stored into the extended memory 10.

The selector circuit 2011 selects a signal on the signal line 1130 if the processing start signal comes via the signal line 1100, and selects the output signal of the subtracter 2030 in the other periods. As a result, when a processing start signal comes via the signal line 1100, the register 1020 receives an extended memory address transferred in synchronism with the processing start signal, and thereafter, it receives an extended memory address for the succeeding data to be stored that is updated by the adder 2030 whenever data is stored into the extended memory 10.

The amount of transferred data set from the signal line 1130 into the register 1020 also has six "0" bits concatenated after its least significant bit. The reason is similar to the one for the extended memory address in the register 1030. More particularly, actual data transfer is done 64 bytes at a time, although the amount of transferred data brought via the signal line 1130 is a number to be multiplied by 4 kbytes. The concatenation of six "0" bits mentioned above converts a number to be multiplied by 4 kbytes to a number to be multiplied by 64 bytes. The subtracter 2030 subtracts a constant "1" from the current remaining amount of transferred data in units of 64 bytes in the register 1020 to generate an updated remaining amount of transferred data whenever 64-byte data is stored into the extended memory 10.

If an ordinary EXTENDED MEMORY WRITE instruction is issued, the data merge circuit 2060 sends all the main memory data of 64 bytes in the register 1040 to the extended memory 10 through a signal line 1330. If an EXTENDED MEMORY PARTIAL WRITE instruction is issued, on the other hand, the data merge circuit 2060 merges the main memory data of 64 bytes from the register 1040 and the extended memory data of 64 bytes from a register 1060 depending upon the tag information in the register 1050. More particularly, each 4-byte data from the register 1040 whose corresponding tag information has a value ON replaces the corresponding 4-byte data from the register 1060. Such a replacement, however, does not occur where the corresponding tag information has a value OFF. The merged 64-byte data is sent to the extended memory 10 through the signal line 1330.

Figure 6:
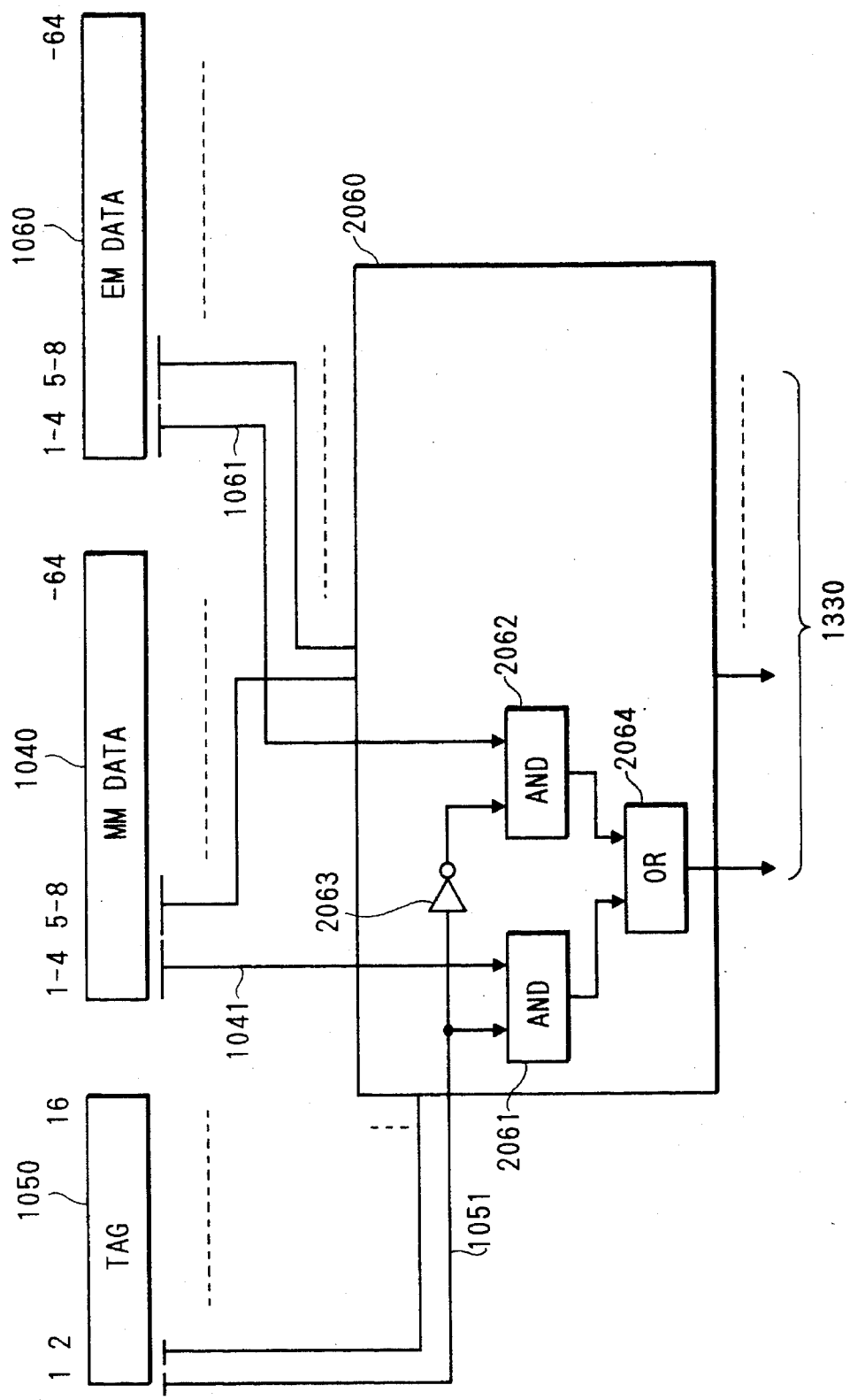
FIG. 6 is a detailed block diagram of the data merge circuit shown schematically in FIG. 5.

FIG. 6 is a detailed diagram showing the data merge circuit 2060. In the figure is shown only a structure for the first 4-byte data for the sake of simplicity as the structures is identical for all 4-byte data. Each 4 bytes of the main memory data in the register 1040 are fed to a first input of a first AND circuit 2061, and the corresponding 4 bytes of the extended memory data in the register 1060 are fed to a first input of a second AND circuit 2060. A tag bit in the register 1050 corresponding to those 4 bytes is fed to a second input of the first AND circuit 2061, and also fed to a second input of the second AND circuit 2062 through a NOT circuit 2063. An OR circuit 2064 receives the output signals of the AND circuits 2061 and 2062 to generate data to be sent through the signal line 1330. If the value of any of the tag bits is ON, the corresponding 4 bytes of the main memory data in the register 1040 are transmitted to the signal line 1330 through the first AND circuit 2061 and the OR circuit 2064. If the value of any of the tag bits is OFF, on the other hand, the corresponding 4 bytes of the extended memory data in the register 1060 are transmitted to the signal line 1330 through the second AND circuit 2062 and the OR circuit 2064.

All the bits in the tag register 1050 are normally kept ON. As a result, in the case of an ordinary EXTENDED MEMORY WRITE instruction that does not transfer the tag information, all the 64-byte main 10 memory data in the register 1040 is transmitted to the signal line 1330.

Returning to FIG. 5, signal lines 1300, 1310, 1320, and 1330 are signal lines for sending information from this extended memory access control 200 to the extended memory 10. The signal line 1300 carries a signal that requests storing data into the extended memory 10. The signal line 1310 carries a signal that requests fetching data from the extended memory 10 as a part of a partial write operation. The signal line 1320 carries an address in the extended memory 10 indicating a location at which data are to be stored or fetched. The signal line 1300 carries data of 64 bytes in width to be stored in the extended memory 10. The data fetched from the extended memory 10 in response to the fetch request signal on the signal line 1310 is received through the signal line 1350.

Signal lines 1400, 1410, 1420, 1430, and 1450 are used when the EXTENDED MEMORY PARTIAL WRITE instruction is processed. The signal line 1430 sends the extended memory address in the 1030 to the extended memory exclusive access control 25. The signal line 1400 is used to inquire of the extended memory exclusive access control 25 as to whether the 64-byte area in the extended memory specified by the address sent through the signal line 1430 is in the lock state or the unlock state. An answer to the inquiry is returned through the signal line 1450. A signal on the signal line 1410 requests the extended memory exclusive access control to lock the 64-byte area in the extended memory specified by the address sent through the signal line 1430. A signal on the signal line 1420 requests the extended memory exclusive access control 25 to unlock the 64-byte area in the extended memory specified by the address sent through the signal line 1430.

The extended memory partial write control 2070 receives the contents of the registers 1000 and 1010 through signal lines 1600 and 1610, respectively. It operates according to an instruction held in the register 1010 when the register 1000 indicates that an instruction is being processed.

Figure 7:
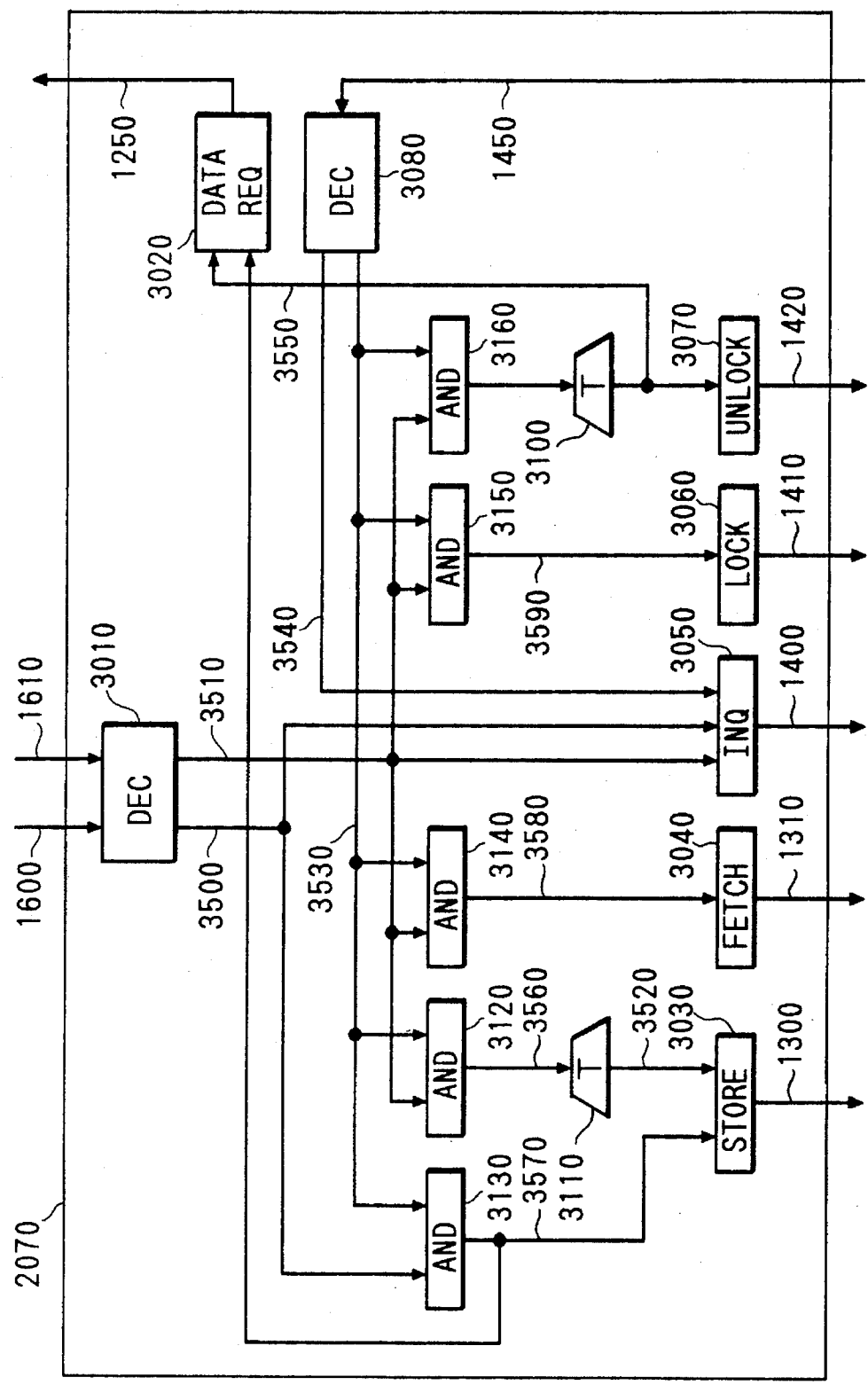
FIG. 7 is a detailed block diagram of the first extended memory partial write control shown schematically in FIG. 5.

FIG. 7 is a detailed diagram showing the extended memory partial write control 2070. Signal lines 1250, 300, 1310, 1400, 1410, 1420, 1450, 1600, and 1610 in the figure are identical with those in FIG. 5. A decoder circuit 3010 operates when the signal line 1610 indicates that an instruction is being processed and decodes the instruction indicated by a signal on the signal line 1610. If the instruction is an ordinary EXTENDED MEMORY WRITE instruction, an ON signal is generated on a signal line 3500. If the instruction is the EXTENDED MEMORY PARTIAL WRITE instruction, an ON signal is generated on a signal line 3510. A decoder circuit 3080 decodes a lock/unlock state answer signal sent through the signal line 1450 from the extended memory exclusive access control 25. If the answer on the signal line 1450 indicates the unlock state, an ON signal is generated on the signal line 3530. If the answer indicates the lock state, an ON signal is generated on a signal line 3540. A data request generating circuit 3020 operates when an ON signal is generated on a signal line 3550 or 3570 and generates a data request signal that requests the main memory to send the succeeding 64-byte data. The data request signal is sent to the main memory through the signal line 1250.

An AND circuit 3130 receives a signal on the signal line 3500 indicating that an ordinary EXTENDED MEMORY WRITE instruction is decoded and a signal on the signal line 3530 indicating that a specified extended memory area is in the unlock state, and generates an ON signal on the signal line 3570. AND circuits 3120, 3140, 3150, and 3160 all receive a signal on the signal line 3510 indicating that an EXTENDED MEMORY PARTIAL WRITE instruction is decoded and a signal on the signal line 3530 indicating that a specified extended memory area is in the unlock state. A first timer 3110 is started by the output signal of the AND circuit 3120. After a time required for fetching data from the extended memory 10 and for subsequently merging data by the data merge circuit 2060, the timer 3110 generates an ON signal on a signal line 3520, and then stops. The AND circuits 3140 and 3150 generate signals on signal lines 3580 and 3590, respectively. A second timer 3100 is started by the output signal of the AND circuit 3160. After a time substantially the same as the first timer 3110, the second timer 3100 generates an ON signal on a signal line 3550, and then stops.

A store control signal generating circuit 3030 generates an extended memory store control signal when an ON signal is generated on the signal line 3520 or 3570. The extended memory store control signal is sent to the extended memory 10 through the signal line 1300. A fetch control signal generating circuit 3040 functions when an EXTENDED MEMORY PARTIAL WRITE instruction is decoded. This circuit 3040 generates an extended memory fetch control signal when an ON signal is generated on the signal line 3580. The extended memory fetch control signal is sent to the extended memory 10 through the signal line 1310. A state inquiry generating circuit 3050 generates a state inquiry signal that inquires the lock/unlock state of a specified extended memory area when an ON signal is generated on the signal line 3500, 3510, or 3540. The state inquiry signal is sent to the extended memory exclusive access control 25 through the signal line 1400.

A lock request generating circuit 3060 and an unlock request generating circuit 3070 also function when an EXTENDED MEMORY PARTIAL WRITE instruction is decoded. The lock request generating circuit 3060 sends a lock request signal to the extended memory exclusive access control 25 through the signal line 1410 when an ON signal is generated on the signal line 3590. The unlock request generating circuit 3070 sends an unlock request signal to the extended memory exclusive access control 25 through the signal line 1420 when the ON signal is generated on the signal line 3550.

Figure 8:
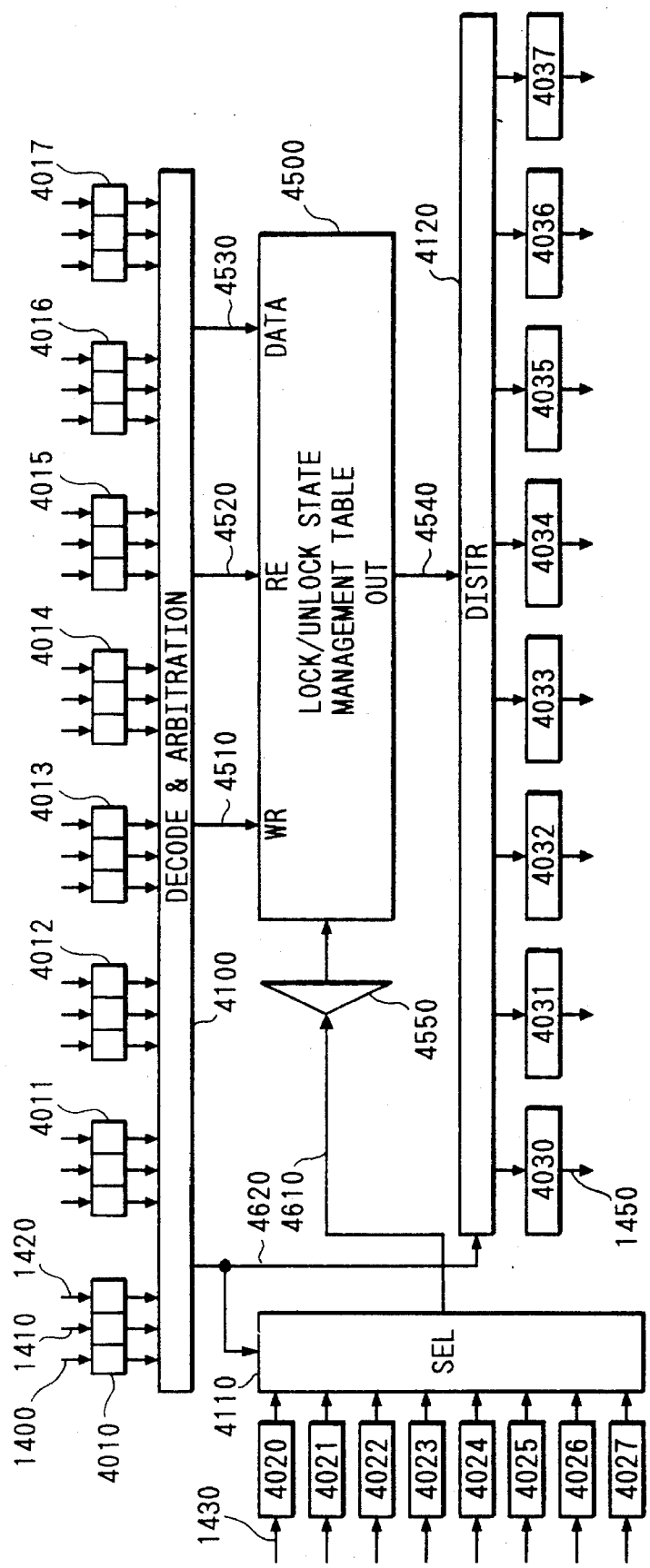
FIG. 8 is a detailed block diagram of the extended memory exclusive access control shown schematically in FIG. 5.

FIG. 8 is a detailed diagram showing the extended memory exclusive access control 25. The extended memory exclusive access control 25, as shown in FIG. 1, is connected with the eight extended memory write controls 200-0 to 200-7 associated with the eight processing units 50 to 57, respectively. The extended 10 memory exclusive access control 25, therefore, has eight interfaces for communications with those extended memory write controls. Each of the interfaces comprises the signal line 1400 for a state inquiry, the signal line 1410 for a lock request, the signal line 1420 for an unlock request, the signal line 1430 for an address, and the signal line 1450 for a state answer. These signal lines were described above in detail with reference to FIGS. 5 and 7.

Registers 4010 to 4017 are 3 bit wide registers corresponding to the respective extended memory write controls 200-0 to 200-7 shown in FIG. 1. Each of these registers is connected with the corresponding extended memory partial write control 2070 (FIG. 7) in the corresponding extended memory write control through the signal line 1400 for a state inquiry, the signal line 1410 for a lock request, and the signal line 1420 for an unlock request. Registers 4020 to 4027 correspond to the extended memory write controls 200-0 to 200-7, respectively. Each of these registers holds the address information sent from the address register 1030 (FIG. 5) in the corresponding extended memory write control through the signal line 1430. Registers 4030 to 4037 also correspond to the extended memory write controls 200-0 to 200-7, respectively- Each of these registers holds an answer to the lock/unlock state inquiry delivered from the extended memory partial write control 2070 in the corresponding extended memory write control. The answers held in these registers are sent to the extended memory partial write controls 2070 (FIG. 7) in the corresponding extended memory write controls through the signal line 1450.

A lock/unlock state management table 4500 is a memory which stores information indicating whether each of the 64-byte blocks in the extended memory 10 is in the lock state or the unlock state. The table 4500 may be fabricated of ordinary memory devices. The address to be accessed is specified by a decoder circuit 4550. Writing is directed through a signal line 4510. A value (lock or unlock) to be written is fed through a signal line 4530. Reading is directed through a signal line 4520. The value read out of the table 4500 appears on a signal line 4540.

A decoding and arbitrating circuit 4100 selects and decodes one of the requests or inquiries set in the registers 4010 to 4017. Circuits functioning like that are well known. If the content of the selected register is a lock/unlock state inquiry, an ON signal is generated on the signal line 4520 to read the content of the lock/unlock state management table 4500. If the content of the selected register is a lock request or an unlock request, an ON signal is generated on the signal line 4510 to write an corresponding value into the lock/ unlock state management table 4500. At the same time, a signal is generated on the signal line 4530. The value of this signal is LOCK (or may be '1') for a lock request or UNLOCK (or may be '0') for an unlock request. During that operation, the decoding and arbitrating circuit 4100 sends a selection signal onto a signal line 4620 to select one of the registers 4020 to 4027 and one of the registers 4030 to 4037 corresponding to the selected one of the registers 4010 to 4017.

A selector circuit 4110 selects one of the registers 4020 to 4027 in accordance with the selection signal on the signal line 4620 and sends the content of the selected register to the decoder circuit 4550 through a signal line 4610. As a result, the decoder circuit 4550 receives and decodes the address information sent from the extended memory write control corresponding to that one of the registers 4010 to 4017 which is selected by the decoding and arbitrating circuit 4100.

A distributor circuit 4120 selects one of the registers 4030 to 4037 in accordance with the selection signal on the signal line 4620 and sets the value on the signal line 4540 in the selected register. As a result, the lock/unlock state signal read out of the lock/unlock state management table 4500 is returned through the signal line 1450 to the extended memory write control corresponding to the register selected by the decoding and arbitrating circuit 4100, that is, the extended memory write control having issued the selected state inquiry.

The extended memory partial write control 2070 (FIG. 7) and the extended memory exclusive access control 25 (FIG. 8) described above cooperate to execute partial write processing through the following steps.

(1) The decoder circuit 3010 generates an ON signal on the signal line 3510 when the signal on the signal line 1600 from the register 1000 (FIG. 5) indicates that an instruction is being executed and the signal on the signal line 1610 from the register 1010 indicates an EXTENDED MEMORY PARTIAL WRITE instruction.

(2) The state inquiry generating circuit 3050 inquiries of the extended memory exclusive access control 25 through the signal line 1400 as to the lock/unlock state of the 64-byte area in the extended memory 10 in which partial writing should be effected. The address of this area is sent to the extended memory exclusive access control 25 from the register 1030 (FIG. 5) through the signal line 1430. An answer to the inquiry whether the area is in the lock state or the unlock state is returned through the signal line 1450. If an answer of the lock state is returned, the same inquiry is repeated until the area is unlocked by another extended memory write control and an answer of the unlock state is returned.

(3) If an answer of the unlock state is returned through the signal line 1450, a lock request generating circuit 3060 sends the lock request signal to the extended memory exclusive access control 25 through the signal line 1410 to lock the area in which partial writing should be effected. In response to this lock request signal, the extended memory exclusive access control 25 locks the extended memory area specified by an address on the signal line 1430. This inhibits the other extended memory write controls from accessing this area.

(4) During that operation, the fetch control signal generating circuit 3040 sends an extended memory fetch control signal to the extended memory 10 through the signal line 1310. The register 1030 (FIG. 5) sends to the extended memory 10 through the signal line 1320 the address of the extended memory area in which partial writing should be effected. The 64-byte data read out of the extended memory 10 are received through the signal line 1350 and set in the register 1060.

(5) The data merge circuit 2060 (FIG. 5) refers to the tag information in the register 1050 and substitutes parts of the 64-byte main memory data in the register 1040 for the corresponding parts of the 64-byte extended memory data in the register 1060, thereby forming merged 64-byte data on the signal line 1330. Toward the end of the merging, the store control signal generating circuit 3030 sends an extended memory store control signal to the extended memory 10 through the signal line 1300. As a result, the merged 64-byte data are written back into the same extended memory area as the 64-byte data in the register 1060 was read from.

(6) In parallel with the generation of the extended memory store control signal mentioned above, the unlock request generating circuit 3070 sends an unlock request signal to the extended memory exclusive access control 25 through the signal line 1420. This unlocks the area which have hitherto been locked. During this operation, the data request generating circuit 3020 (FIG. 7) requests through the signal line 1250 that the 64-byte data for the succeeding partial writing should be sent.

(7) The operations described above are repeated until the amount of remaining transferred data in the register 1020 (FIG. 5) becomes zero.

A brief explanation will then be given of operations where the instruction code held in the register 1010 indicates an ordinary EXTENDED MEMORY WRITE instruction. In this case, the decoder circuit 3010 generates an ON signal on the signal line 3500. In response to this signal, the state inquiry generating circuit 3050 inquiries of the extended memory exclusive access control 25 as to whether the extended memory area into which data is to be written has been locked or unlocked. If an answer of the lock state is returned, the state inquiry is repeated until an answer of the unlock state is returned. If an answer of the unlock state is returned, the store control signal generating circuit 3030 sends an extended memory store control signal to the extended memory 10. At the same time, the data request generating circuit 3020 sends a data request signal that requests the main memory to send the succeeding 64-byte data.

In this case, the fetch control signal generating circuit 3040, the lock request generating circuit 3060, the timer 3100, and the unlock request generating circuit 3070 do not operate. The tag information is not transferred. When an ordinary EXTENDED MEMORY WRITE instruction is decoded, the data merge circuit 2060 sends all the 64 bytes (main memory data) in the register 1040 to the extended memory 10.

In the example of parallel processing described above, the data arrays were subdivided into the first and last halves. Alternatively, any other pattern of subdivision is possible. The data array, as an example, may be subdivided into even-numbered elements and odd-numbered elements. If such a subdivision is made, it will be needed to transfer all the pages with use of the EXTENDED MEMORY PARTIAL WRITE instruction.

As to the hardware configuration, the main memory and/or the extended memory may be combined with a so-called buffer memory or cache. The amount of data transferred in each machine cycle can be made larger than 64 bytes if the lock/unlock operations occurring in a series of partial write processings are so many that the system performance would be lowered.

As described so far, the present invention has the advantage that a very large size of data array can be computed in parallel at a high efficiency and flexibility since a plurality of processing units having different main memories can use an extended memory as the large capacity memory area for computation. In particular, the extended memory partial write mechanism of the present invention makes it easy to store data from different main memories into the same page of the extended memory without confusion. It also achieves a high efficiency in data transfer to the extended memory involving partial write operations since it arbitrates access conflicts for every transfer of a subblock of data, for example, 64 bytes, that is transferred at a time.

What is claimed is:

1. A method of parallel processing by a computer system which includes a first subsystem including a first processing unit and a first main memory connected to said first processing unit, a second subsystem including a second processing unit and a second main memory connected to said second processing unit, and an auxiliary random-access memory connected to said first and second subsystems and having an address space other than those of said first and second main memories, each addressable location in said first and second main memories having a capacity of a first size, and each addressable location in said auxiliary random-access memory having a capacity of a second size larger than said first size, said method comprising the steps of:

(a) computing first data and storing said first data into said first main memory by said first processing unit, said first data consisting of data elements each having said first size:

(b) sending from said first main memory to said auxiliary random-access memory a first block of data having a size of an integer multiple of said second size and including said first data;

(c) writing said first data into a first area in said auxiliary random-access memory;

(d) computing second data and storing said second data into said second main memory by said second processing unit, said second data having a predetermined positional relationship to said first data and consisting of data elements each having said first size;

(e) sending from said second main memory to said auxiliary random-access memory a second block of data having a size of an integer multiple of said second size and including said second data; and (f) writing said second data into a second area in said auxiliary random-access memory, said second area having said predetermined positional relationship to said first area;

wherein said first block of data includes a first subblock of data of said second size consisting of part of said first data and data other than said first data;

wherein said second block data includes a second subblock of data of said second size consisting of part of said second data and data other than said second data, wherein said first second areas in said auxiliary random-access memory share a subarea of said second size;

wherein said writing step (c) includes writing said part of the first data alone into a first part of said subarea; and wherein said writing step (f) includes writing said part of said second data alone into a second part of said subarea; and wherein said method includes the further step of:

generating by said first processing unit first identifying information identifying said part of said first data in said first subblock;

generating by said second processing unit second identifying information identifying said part of said second data in said second subblock;

sending said first identifying information from said first subsystem to said auxiliary random-access memory for identifying said part of the first data to be written into said first part of the first subarea; and sending said second identifying information from said second subsystem to said auxiliary random-access memory for identifying said part of the second data to be written into said second part of the second subarea.

2. A method as claim in claim 1, wherein:

the step of generating the first identifying information includes storing the first identifying information into said first main memory; and the step of generating the second indentifying information includes storing the second identifying information into said second main memory.

3. A method as claimed in claim 1, wherein:

the step of generating the first identifying information includes storing the first indentifying information into a first special-purpose memory in said first subsystem; and the step of generating the second indentifying information includes storing the second indentifying information into a second special-purpose memory in said second subsystem.

4. A data processing system comprising:

at least one subsystem including a main memory having addressable locations each having a capacity of a first size and at least one processor connected to said main memory for computing data elements each having said first size;

an auxiliary random-access memory connected to said subsystem, said auxiliary random-access memory having an address space other than that of said main memory and having addressable locations each having a capacity of a second size larger than said first size; and access control means connected between said subsystem and said auxiliary random-access memory for controlling access to said auxiliary random-access memory, said access control means including means responsive to a predetermined instruction from said processor for substituting a part of data of said second size from said main memory for a corresponding part of data of said second size in said auxiliary random-access memory;

wherein data is transferred in a third size at a time between said main memory and said auxiliary random-access memory, said third size being smaller than said second size but larger than said first size, and said substituting means operates on data of said third size;

wherein said substituting means includes means for reading data of said third size from a location in said auxiliary random-access memory, merging means for substituting a part of data of said third size from said main memory for a corresponding part of said data read from the auxiliary random-access memory to form merged data of said third size, and means for writing said merged data back into said location in the auxiliary random-access memory;

wherein said subsystem includes means for generating identifying information identifying data elements computed by said processor and means for sending to said access control means said identifying information corresponding to transferred data, and said substituting means further includes means connected to said merging means and responsive to said identifying information for indentifying said part of the data from the subsystem to be substituted.

5. A system as claimed in claim 4, wherein said generating means stores the identifying information into said main memory.

6. A system as claimed in claim 4, wherein said generating means includes a special-purpose memory for storing the identifying information.

7. A system as claimed in claim 4, wherein said substituting means includes:

a first register for retaining the data of said third size from said subsystem;

a second register for retaining the data of said third size from said auxiliary memory;

a third register for retaining said identifying information; and a merging circuit for substituting a portion of content of said second register for a portion of content of said first register, both said portions being identified by content of said third register.

8. A parallel processing system comprising:

a first subsystem including a first main memory having addressable locations each having a capacity of a first size and at least one processor connected to said first main memory for computing data elements each having said first size;

a second subsystem being able to operate concurrently with said first subsystem and including a second main memory having addressable locations each having a capacity of said first size and at least one processor connected to said second main memory for computing data elements each having said first size;

an auxiliary random-access memory connected to said first and second subsystems in common, said auxiliary random-access memory having an address space other than those of said first and second main memories and having addressable locations each having a capacity of a second size larger than said first size; and access control means connected between said first and second subsystems and said auxiliary random-access memory for controlling access to said auxiliary random-access memory, said access control means including means responsive to a predetermined instruction from either of said first and second processors for substituting a part of data of said second size from the main memory connected to the processor that issued said instruction for a corresponding part of data of said second size in said auxiliary random-access memory, and means responsive to operations of said substituting means for managing a lock/unlock state of each area in said auxiliary random-access memory, wherein any processor is inhibited from writing data into an area having been locked by another processor, but any processor is permitted to write data into an area having been unlocked, wherein data is transferred in a third size at a time between either of said first and second main memories and said auxiliary random-access memory, said substituting means operates on data of said third size at a time, and said managing means manages the lock/unlock state of each area of said third size, said third size being smaller than said second size but larger than said first size, wherein said substituting means includes:
- means for inquiring of said managing means about the lock/unlock state of a specified area of said third size in said auxiliary random-access memory;
- means for executing or withholding writing into a specified area depending upon the lock/unlock state of said specified area answered by said managing means;
- means for requesting said managing means to lock a specified area in said auxiliary random-access memory upon reading data from said specified area previous to substitution; and
- means for requesting said managing means to unlock a specified area in said auxiliary random access memory upon writing data into said specified area subsequent to substitution.

9. A parallel processing system comprising:

a first subsystem including a first memory having addressable locations each having a capacity of a first size and at least one processor connected to said first main memory for computing data elements each having said first size;

a second subsystem being able to operate concurrently with said first subsystem and including a second main memory having addressable locations each having a capacity of said first size and at least one processor connected to said second main memory for computing data elements each having said first size;

an auxiliary random-access memory connected to said first and second subsystems in common, said auxiliary random-access memory having an address space other than those of said first and second main memories and having addressable locations each having a capacity of a second size larger than said first size; and access control means connected between said first and second subsystems and said auxiliary random-access memory for controlling access to said auxiliary random-access memory, said access control means including means responsive to a predetermined instruction from either of said first and second processors for substituting a part of data of said second size from the main memory connected to the processor that issued said instruction for a corresponding part of data of said second size in said auxiliary random-access memory, and means responsive to operations of said substituting means for managing a lock/unlock state of each area in said auxiliary random-access memory, wherein any processor is inhibited from writing data into an area having been locked by another processor, but any processor is permitted to write data into an area having been unlocked, wherein data is transferred in a third size at a time between either of said first and second main memories and said auxiliary random-access memory, said substituting means operates on data of said third size at a time, and said managing means manages the lock/unlock state of each area of said third size, said third size being smaller than said second size but larger than said first size, wherein said managing means includes:
- table means for holding information indicative of the lock/unlock state of each area of said third size in said auxiliary random-access memory;
- means for reading from said table means the lock/unlock state of a specified one of the areas of said third size; and
- means for setting the lock/unlock state of a specified one of the areas of said third size to the lock state upon initiation of data substitution in the specified area, and to the unlock state upon completion of said data substitution.

* * * * *